(12) United States Patent
Inoue et al.

(10) Patent No.: US 7,708,353 B2
(45) Date of Patent: May 4, 2010

(54) SEAL ASSEMBLY FOR HUB FLANGE AND SLINGER

(75) Inventors: Shigeru Inoue, Yokohama (JP);
Chikayoshi Murotani, Tokyo (JP);
Shigeaki Furusawa, Sagamihara (JP);
Takumi Harada, Kawasaki (JP);
Yutaka Koma, Hachioji (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 11/889,424

(22) Filed: Aug. 13, 2007

(65) Prior Publication Data
US 2008/0174170 A1 Jul. 24, 2008

(30) Foreign Application Priority Data
Aug. 14, 2006 (JP) ............................. P2006-220942

(51) Int. Cl.
*B60B 35/18* (2006.01)
(52) U.S. Cl. ........................ 301/105.1; 301/6.8; 188/17; 384/484; 384/544
(58) Field of Classification Search ............ 301/35.621, 301/35.623, 35.624, 35.625, 35.626, 35.632, 301/105.1, 6.1, 6.8; 384/484, 485, 544, 589; 188/17, 26; 277/590, 628
See application file for complete search history.

(56) References Cited

U.S. PATENT DOCUMENTS

| | | | | |
|---|---|---|---|---|
| 2,956,632 A | * | 10/1960 | Forbush et al. | 180/385 |
| 4,402,558 A | * | 9/1983 | Olschewski et al. | 384/469 |
| 5,127,747 A | * | 7/1992 | Hilby et al. | 384/448 |
| 6,017,097 A | * | 1/2000 | Weir, III | 301/105.1 |
| 2005/0018939 A1 | * | 1/2005 | Niwa et al. | 384/544 |
| 2007/0076994 A1 | * | 4/2007 | Norimatsu et al. | 384/486 |
| 2008/0199120 A1 | * | 8/2008 | Torii et al. | 384/480 |

FOREIGN PATENT DOCUMENTS

| | | |
|---|---|---|
| JP | 2001-191717 | 7/2001 |
| JP | 2005-233287 | 9/2005 |

* cited by examiner

*Primary Examiner*—Russell D Stormer
(74) *Attorney, Agent, or Firm*—McGinn IP Law Group PLLC

(57) ABSTRACT

An axle bearing apparatus includes a hub shaft including a wheel-mounting flange formed at its outer end portion, and a cylindrical portion formed on an inner side surface of the flange, a bearing portion press-fitted on the cylindrical portion of the hub shaft and including an inner ring, an outer ring and rolling elements disposed between the inner and outer rings, and a slinger having a through hole formed through its central portion. The through hole is fitted on the cylindrical portion such that an outer diameter of the slinger is generally equal to an outer diameter of the flange, and the slinger is press-clamped to the inner side surface of the flange by bolts press-fitted respectively in a plurality of bolt holes formed in the flange. O-rings are interposed between the flange and the slinger.

8 Claims, 6 Drawing Sheets

SEAL ASSEMBLY FOR HUB FLANGE AND SLINGER

BACKGROUND OF THE INVENTION

This invention relates to an axle bearing apparatus, and more particularly to an axle bearing apparatus having muddy water intrusion prevention means for preventing muddy water from intruding into a bearing portion.

Recently, unit-type axle bearing apparatuses have increasingly been used even in a pickup truck, etc., and therefore these bearing apparatuses are required to have a higher muddy water-proof ability.

There is known an axle bearing apparatus having such a muddy water-proof ability, in which a seal ring comprising a metal core and a seal member is fixed to an outer end portion of an outer ring of a bearing portion, and a slinger is fixed to an axial inner side surface of a rotary flange, and is held in sliding contact with the seal ring, thereby closing an opening of the bearing portion (see, for example, JP-A-2005-233287).

In the axle bearing apparatus of JP-A-2005-233287, an annular portion of the slinger is not disposed in intimate contact with the axial inner side surface of the rotary flange, and extends merely to a region disposed radially inwardly of a circle of bolt holes formed in the rotary flange. Therefore, there has been a fear that muddy water might intrude into the bearing portion from the outside of the rotary flange and the bolt holes through a clearance between the rotary flange and the annular portion of the slinger.

SUMMARY OF THE INVENTION

This invention has been made in order to solve the above problem, and an object of the invention is to provide an axle bearing apparatus in which muddy water is positively prevented from intruding into a bearing portion from an outer periphery, bolt holes, etc., of the flange through a clearance between the flange and a slinger.

According to one aspect of the present invention, there is provided an axle bearing apparatus characterized in that the bearing apparatus comprises a hub shaft including a wheel-mounting flange formed at its outer end portion, and a cylindrical portion formed on an inner side surface of the flange; a bearing portion press-fitted on the cylindrical portion of the hub shaft and comprising an inner ring, an outer ring and rolling elements disposed between the inner and outer rings; a slinger having a through hole formed through its central portion, the through hole being fitted on the cylindrical portion such that an outer diameter of the slinger is generally equal to an outer diameter of the flange, and the slinger being press-clamped to the inner side surface of the flange by bolts press-fitted respectively in a plurality of bolt holes formed in the flange; and an O-ring is interposed between the flange and the slinger.

According to another aspect of the invention, there is provided an axle bearing apparatus comprising the hub shaft, the bearing portion, and the slinger, wherein the slinger is bonded to the flange by an adhesive.

According to a further aspect of the invention, there is provided an axle bearing apparatus comprising the hub shaft, the bearing portion, and the slinger, wherein a seal member is interposed between the flange and the slinger.

In any one of the above axle bearing apparatuses, a rib is formed at an outer periphery of the slinger, and is fitted to an outer periphery of the flange.

In the present invention, the O-ring or the seal member is interposed between the flange of the hub shaft and the slinger between which muddy water is liable to intrude, and as another alternative, the flange and the slinger are adhesively bonded together by the adhesive. Therefore, muddy water is positively prevented from intruding into the bearing portion through a clearance between the flange and the slinger.

DETAILED DESCRIPTION OF PREFERRED EMBODIMENTS

First Embodiment

Figure 1:
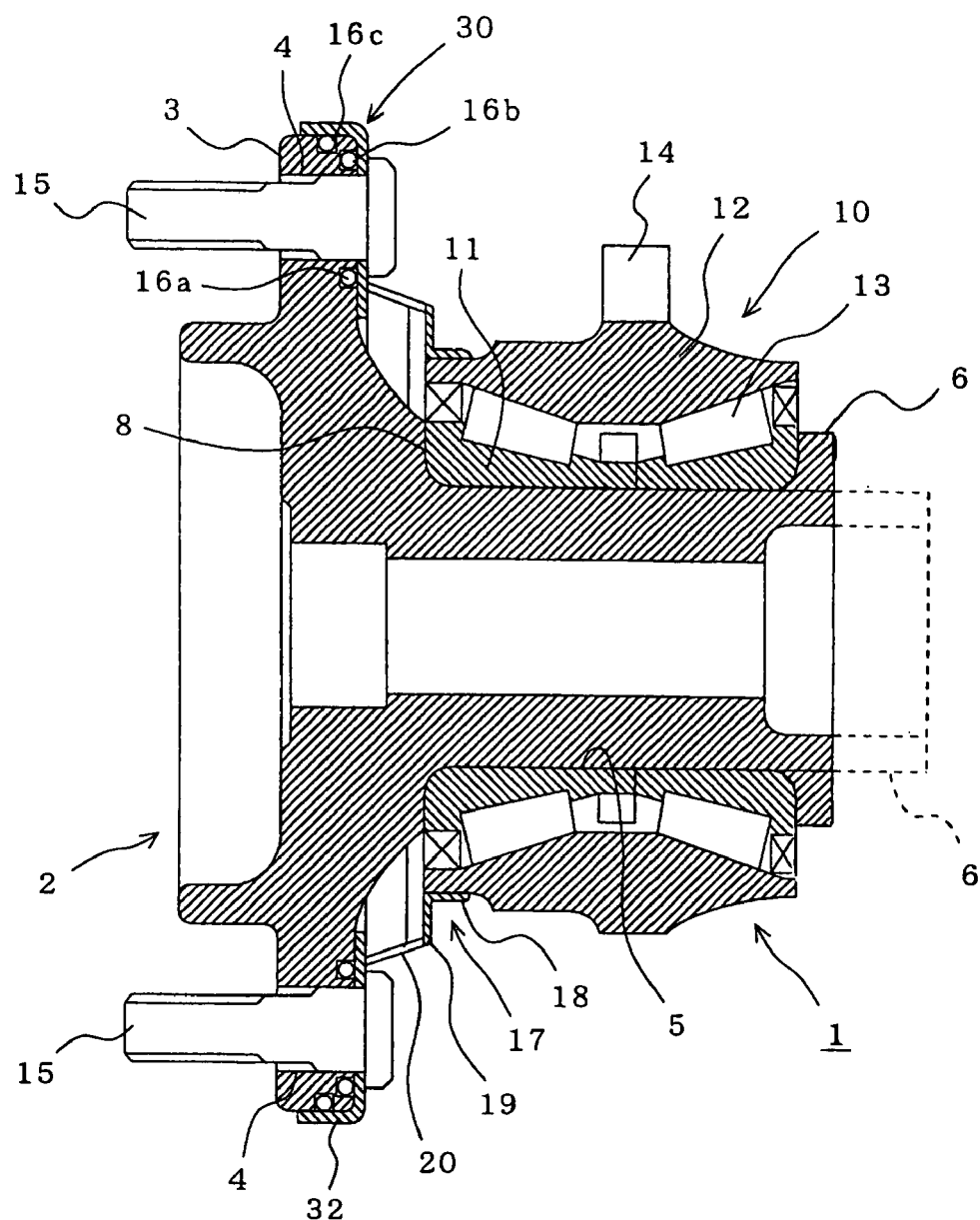
FIG. 1 is a cross-sectional view of a first embodiment of an axle bearing apparatus of the present invention.

FIG. 1 is a vertical cross-sectional view of an axle bearing apparatus according to a first embodiment of the present invention. In the following description, the right side in the drawings will be referred to as "inner side", while the left side will be referred to as "outer side".

In the drawings, reference numeral 1 denotes the axle bearing apparatus of the invention, and a flange 3 is formed on an outer periphery of a hub shaft 2 (made of a steel material) at an outer end portion thereof, and a plurality of bolt holes 4 are formed through this flange 3. Bolts 5 are passed respectively through these bolt holes 4 so as to mount a wheel (not shown) on the flange 3. A cylindrical portion 5 for the mounting of a bearing portion 10 (described later) thereon is formed on a central portion of the inner side of the flange 3, and projects therefrom in an axial direction. A cylindrical caulking portion 6 (indicated in broken lines) for fixing the bearing portion 10 is formed in a projecting manner at an inner end of the cylindrical portion 5.

Figure 2:
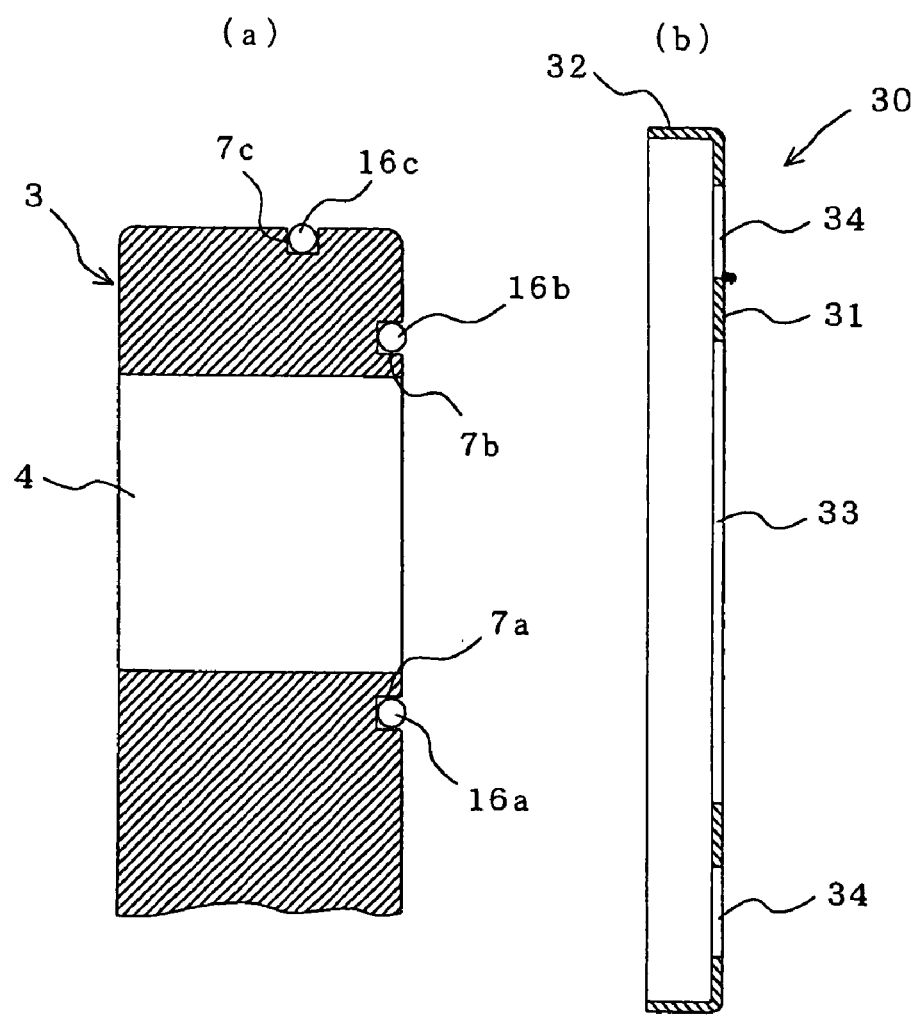
FIG. 2A is a cross-sectional view of an important portion of a flange.
FIG. 2B is a cross-sectional view of a slinger.

As shown in FIG. 2A, two ring-like grooves 7a and 7b for respectively receiving O-rings 16a and 16b (described later) are formed in the inner side surface of the flange 3 in concentric relation to each other, and are disposed respectively at inner and outer periphery sides of a circle of bolt holes 4. Similarly, a groove 7c for receiving an O-ring 16c is formed in an outer peripheral surface of the flange 3.

The bearing portion 10 comprises an inner ring 11 divided into two sections each having a rolling contact surface (raceway surface) formed between ribs formed respectively at opposite ends thereof, an outer ring 12 having two rows of rolling contact surfaces corresponding respectively to the two rolling contact surfaces of the inner ring 11, and two rows of tapered rollers (rolling elements) 13 disposed between the inner and outer rings 11 and 12, each row of tapered rollers 13 being disposed between the corresponding rolling contact surfaces of the inner and outer rings 11 and 12.

The bearing portion 10 is press-fitted onto an outer peripheral surface of the cylindrical portion 5 of the hub shaft 2, and then the caulking portion 6 is bent radially outwardly for caulking purposes as indicated in solid lines, and by doing so, the bearing portion 10 is held between a step portion 8 (formed at that portion of the cylindrical portion 5 disposed close to the flange 3) and the caulking portion 6. Then, the outer ring 12 is mounted on an axle case or other portion (not shown) through a flange 14 formed on the outer periphery of the outer ring 12 in such a manner that the outer ring 12 can not rotate.

An externally-mounting dust seal 17 comprises a cylindrical metal core 18 (whose inner diameter is substantially equal to an outer diameter of the outer end portion of the outer ring 12 of the bearing portion 10) made of a metal material with excellent corrosion resistance (such as stainless steel, an alloy, etc.), a flange 19 formed on an outer periphery of the metal core 18 at an outer end thereof, and a lip 20 provided at an outer peripheral edge of the flange 19 and made of an elastic material such as rubber. The dust seal 17 is mounted on the bearing portion 10 with the metal core 18 press-fitted on the outer end portion of the outer ring 12.

Reference numeral 30 denotes a slinger which is formed of a metal plate with excellent corrosion resistance such for example as a zinc plated steel plate, a chromium plated steel plate, a stainless steel plate, a titanium plate, etc. As shown in FIG. 2B, this slinger 30 includes a doughnut-shaped body portion 31 having a through hole 33 (whose diameter is larger than the outer diameter of the cylindrical portion 5) formed through a central portion thereof, and having an outer diameter generally equal to the outer diameter of the flange 3, and a rib 32 formed by bending its outer peripheral portion toward the outer side. A width of the rib 32 is generally equal to or slightly smaller than a width (wall thickness) of the flange 3. Bolt passage holes 34 are formed through that portion of the body portion 31 lying between the through hole 33 and the rib 32, so as to be aligned respectively with the bolt holes 4, the bolt passage holes 34 being slightly larger in diameter than the bolt holes 4.

Next, one example of a procedure of assembling the axle bearing apparatus 1 of the above construction will be described.

First, the O-rings 16a, 16b and 16c are fitted respectively into the grooves 7a, 7b and 7c formed in the flange 3 of the hub shaft 2. Then, the through hole 33 of the slinger 30 is fitted on the cylindrical portion 5 from the inner side, and the rib 32 is fitted on the outer periphery of the flange 3 to be retained thereon, and also the body portion 31 is held against the inner side surface of the flange 3, and the bolt passage holes 34 of the body portion 31 are aligned respectively with the bolt holes 4 of the flange 3.

In this condition, the bolts 15 are passed through the respective bolt passage holes 34 of the slinger 30, and are press-fitted into the respective bolt holes 4 of the flange 3. By doing so, the slinger 30 is press-clamped to the inner side surface of the flange 3 through the O-rings 16a and 16b, so that a water-tight seal is formed between the inner side surface of the flange 3 and the slinger 30. Also, the rib 32 is press-clamped to the outer peripheral surface of the flange 3 through the O-ring 16c, so that a water-tight seal is formed between the outer peripheral surface of the flange 3 and the slinger 30.

Then, the bearing portion 10 having the metal core 18 of the externally-mounting dust seal 17 press-fitted on the outer end portion of the outer ring 12 is press-fitted onto the outer peripheral surface of the cylindrical portion 5 from the inner side. Then, the caulking portion 6 is bent to extend radially outwardly, so that the bearing portion 10 is held between the step portion 8 and the caulking portion 6. At this time, the lip 20 of the externally-mounting dust seal 17 is held in sliding contact with an inner side surface of the slinger 30. In the above description, although the bearing portion 10 pressed-fitted on the cylindrical portion 5 is fixed by bending the caulking portion 6, the fixing means is not limited to this construction, and there can be used any other suitable fixing means such for example as one in which an externally-threaded portion is formed on the outer peripheral surface of the inner end portion of the cylindrical portion 5, and a nut is threaded on this externally-threaded portion, thereby fixing the bearing portion 10.

Figure 3:
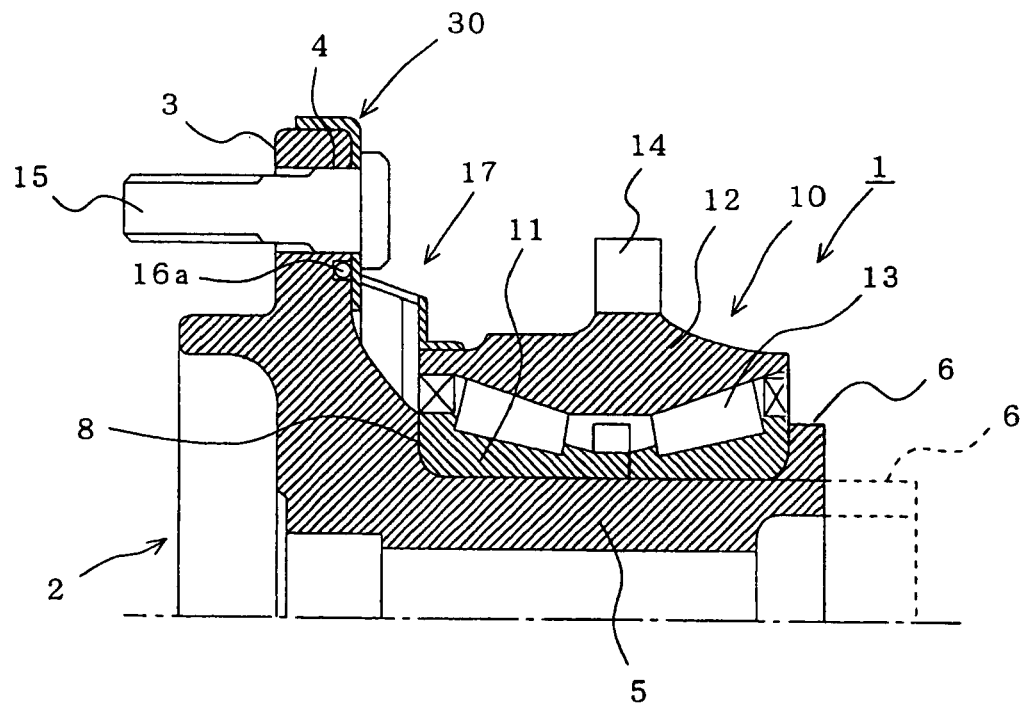
FIG. 3 is a cross-sectional view of a portion of a modified example of the first embodiment.

FIG. 3 is a cross-sectional view of a half portion of a modified example of the axle bearing apparatus according to the first embodiment on one side of a centerline (longitudinal axis) thereof. Those portions identical to those of the axle bearing apparatus of FIG. 1 will be designated by identical reference numerals, respectively, and explanation thereof will be omitted.

In this modified example, among the O-rings 16a to 16c (see FIG. 1) provided between the flange 3 of the hub shaft 2 and the slinger 30, the O-ring 16b (at the outer periphery side of the circle of bolt holes 4) and the O-ring 16c (at the outer peripheral surface of the flange 3) are omitted, and only the O-ring 16a is provided at the inner periphery side of the circle of bolt holes 4. The other construction is the same as that of FIG. 1.

In this embodiment, the slinger 30 is provided at the inner side of the flange 3 of the hub shaft 2, and the O-rings 16a and 16b form a seal between the slinger 30 and the inner side surface of the flange 3, and also the O-ring 16c forms a seal between the slinger 30 and the outer peripheral surface of the flange 3. In the modified form of the invention, the O-ring 16a forms a seal between the slinger 30 and the inner side surface of the flange 3. Therefore, muddy water is positively prevented from intruding into the bearing portion 10 from the outer periphery, the bolt holes 4, etc., of the flange 3 through a clearance between the flange 3 and the slinger 30. And besides, the rib 32 formed at the outer periphery of the slinger 30 is retained on the outer periphery of the flange 3, and therefore the slinger 30 will not be displaced out of position during the assembling operation.

Second Embodiment

Figure 4:
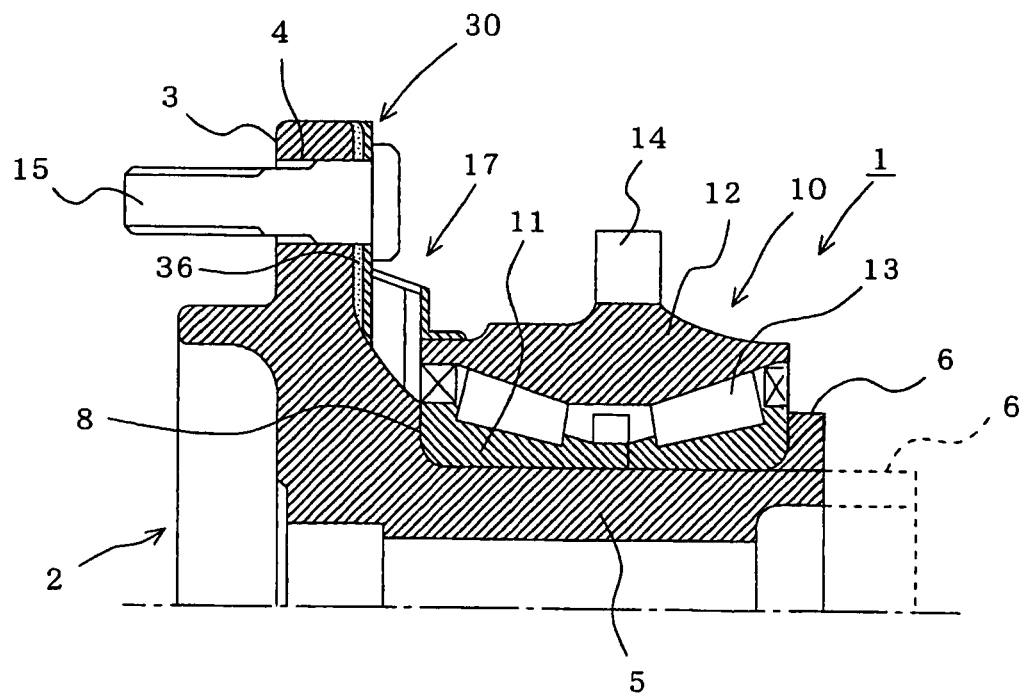
FIG. 4 is cross-sectional view of a portion of a second embodiment of an axle bearing apparatus of the invention.

FIG. 4 is a cross-sectional view of a half portion of an axle bearing apparatus according to a second embodiment of the invention on one side of a centerline (longitudinal axis) thereof. Those portions identical to those of the first embodiment will be designated by identical reference numerals, respectively, and explanation thereof will be omitted.

In this embodiment, a slinger 30 is composed solely of a body portion 31, and therefore does not have the rib 32 as described above for the first embodiment. Furthermore, the O-rings 16a to 16c as described above for the first embodiment are not interposed between a flange 3 of a hub shaft 2 and the slinger 30 (Therefore, the grooves 7a to 7c are not formed in the flange 3), and the slinger 30 is adhesively bonded to an inner side surface of the flange 3 by an adhesive 36. In this embodiment, the rib 32 may be formed at the outer periphery of the body portion 31 as in the first embodiment.

In this embodiment, also, similar advantageous effects to those of the first embodiment can be obtained.

Third Embodiment

Figure 5:
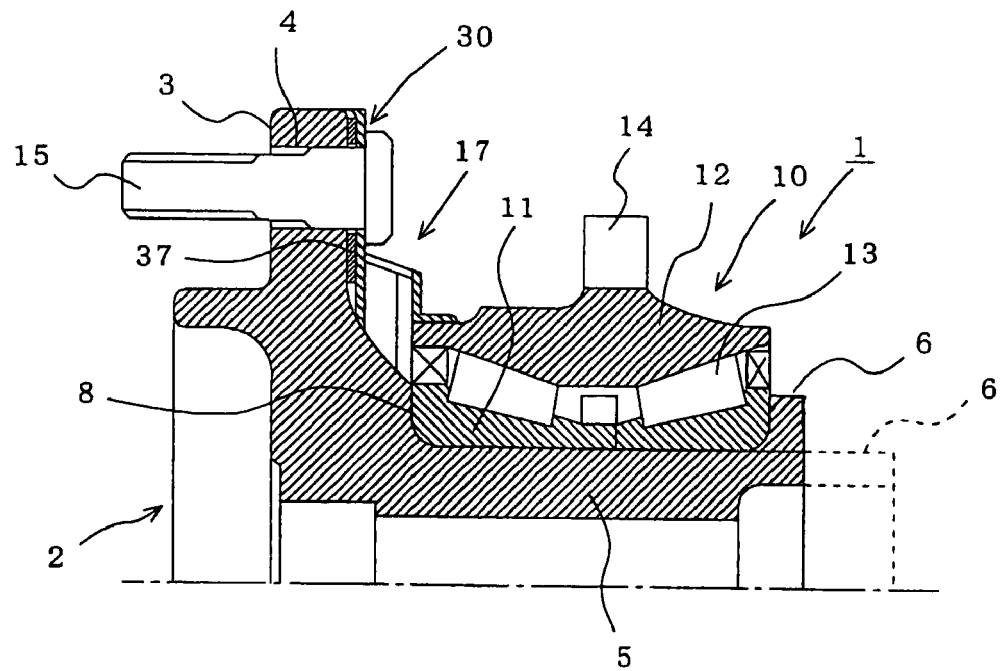
FIG. 5 is cross-sectional view of a portion of a third embodiment of an axle bearing apparatus of the invention.

FIG. 5 is a cross-sectional view of a half portion of an axle bearing apparatus according to a third embodiment of the invention on one side of a centerline (longitudinal axis) thereof. Those portions identical to those of the second embodiment will be designated by identical reference numerals, respectively, and explanation thereof will be omitted.

In this embodiment, a seal member 37 made of an elastic material such as rubber is interposed between a slinger 30 (which has the same structure as that of the slinger 30 of the second embodiment) and an inner side surface of a flange 3 of a hub shaft 2. The seal member 37 may be provided over an entire area of contact between the slinger 30 and the flange 3, or may be provided only at an area disposed radially inwardly of a circle of bolt holes 4 or only at areas disposed respectively around the bolt holes 4.

In this embodiment, also, similar advantageous effects to those of the first embodiment can be obtained.

Fourth Embodiment

Figure 6:
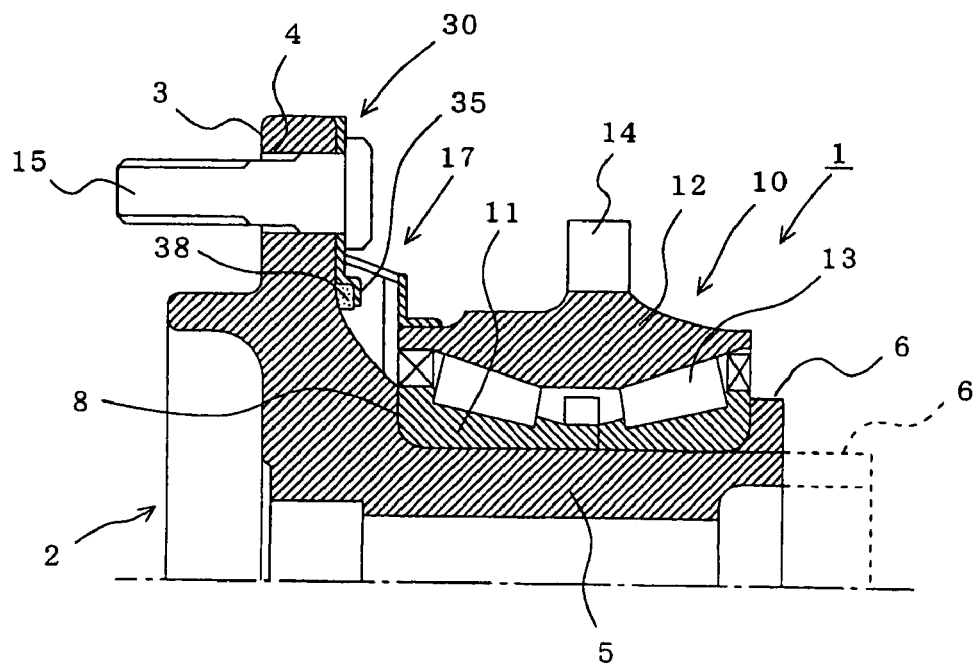
FIG. 6 is cross-sectional view of a portion of a fourth embodiment of an axle bearing apparatus of the invention.

FIG. 6 is a cross-sectional view of a half portion of an axle bearing apparatus according to a fourth embodiment of the invention on one side of a centerline (longitudinal axis) thereof. Those portions identical to those of the second embodiment will be designated by identical reference numerals, respectively, and explanation thereof will be omitted.

In this embodiment, a slinger 30 does not have the rib 32 as described above for the first embodiment, and a peripheral edge portion of a through hole 33 formed through the slinger 30 is bent toward the inner side to form a bent portion 35 of a generally L-shaped cross-section. The slinger 30 is held against an inner side surface of the flange 3, and a seal member 38 made of an elastic material such as rubber is interposed between the bent portion 35 and the flange 3.

In this embodiment, also, similar advantageous effects to those of the first embodiment can be obtained.

Fifth Embodiment

Figure 7:
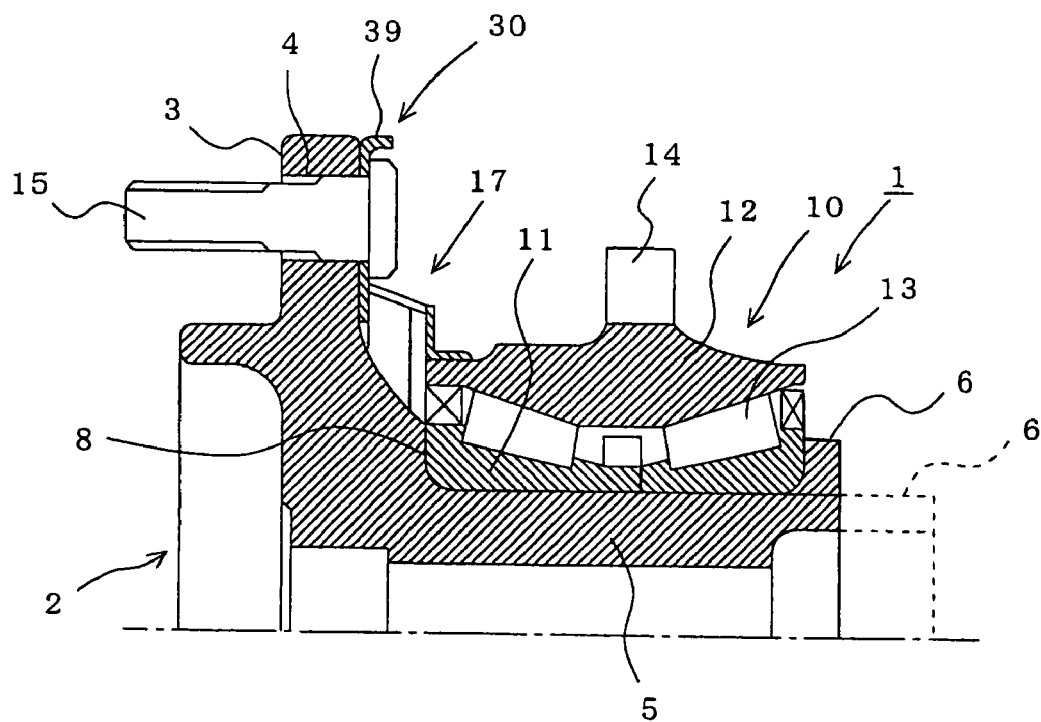
FIG. 7 is cross-sectional view of a portion of a fifth embodiment of an axle bearing apparatus of the invention.

FIG. 7 is a cross-sectional view of a half portion of an axle bearing apparatus according to a fifth embodiment of the invention on one side of a centerline (longitudinal axis) thereof. Those portions identical to those of the first embodiment will be designated by identical reference numerals, respectively, and explanation thereof will be omitted.

A slinger 30 is fixedly held between a flange 3 of a hub shaft 2 and heads of bolts 15 press-fitted in respective bolt holes 4 as described above. When the bolts 15 are press-fitted into the respective bolt holes 4, the slinger 30 is, in some cases, deformed, so that a lip 20 of an externally-mounting dust seal 17 fails to be disposed in uniform contact with a sliding contact surface (inner side surface) of the slinger 30, and as a result muddy water may intrude into a bearing portion 10 through a clearance.

In this embodiment, an outer peripheral edge portion of the slinger 30 is bent toward the inner side to form a bent portion 39, thereby increasing the rigidity of the slinger 30 so as to prevent deformation of the slinger 30. Instead of forming this bent portion 39, a peripheral edge portion of a through hole 33 in the slinger 30 may be bent toward the inner side to form a bent portion 39a as shown in FIG. 8A, or in addition to the bent portion 39, the inner peripheral edge portion of the through hole 33 may be bent toward the inner side to form a bent portion 39a as shown in FIG. 8B.

Figure 8:
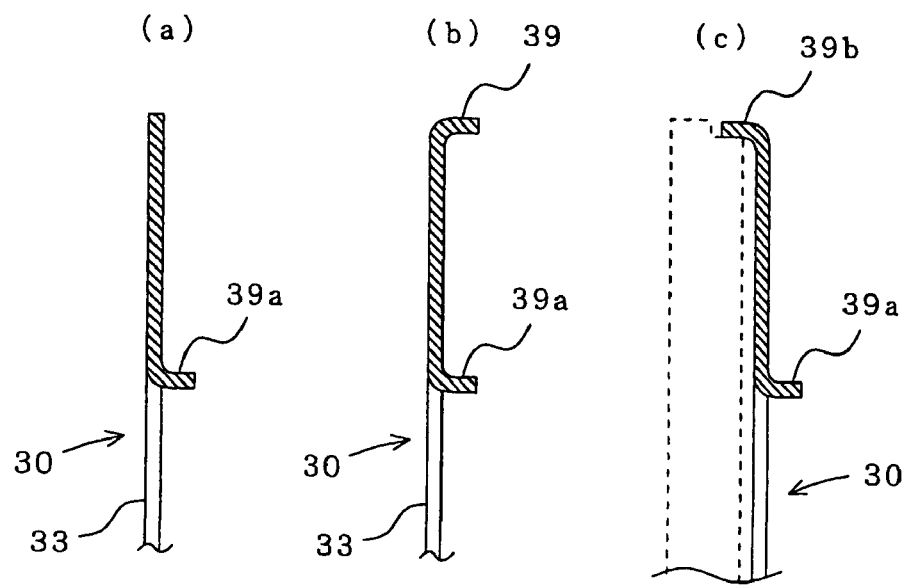
FIGS. 8A to 8C are views explanatory of modified slingers used in the axle bearing apparatus of the fifth embodiment.

In a further modified example, the outer peripheral edge portion of the slinger 30 may be bent toward the outer side to form a bent portion 39b, and also the peripheral edge portion of the through hole 33 may be bent toward the inner side to form a bent portion 39a as shown in FIG. 8C.

In this embodiment, the rigidity of the slinger 30 can be increased, and therefore when the bolts 15 are press-fitted into the respective bolt holes 4, the deformation of the slinger 30 can be suppressed. Therefore, the lip 20 of the externally-mounting dust seal 17 is positively held in sliding contact with the side surface of the slinger 30, thereby preventing the intrusion of muddy water. The bent portion or portions 39, 39a, 39b for increasing the rigidity of the slinger 30 can be formed at the slingers 30 of the above second to fourth embodiments and also at the slinger 30 of the modified example (in which the provision of the rib 32 is omitted) of the first embodiment.

Sixth Embodiment

Figure 9:
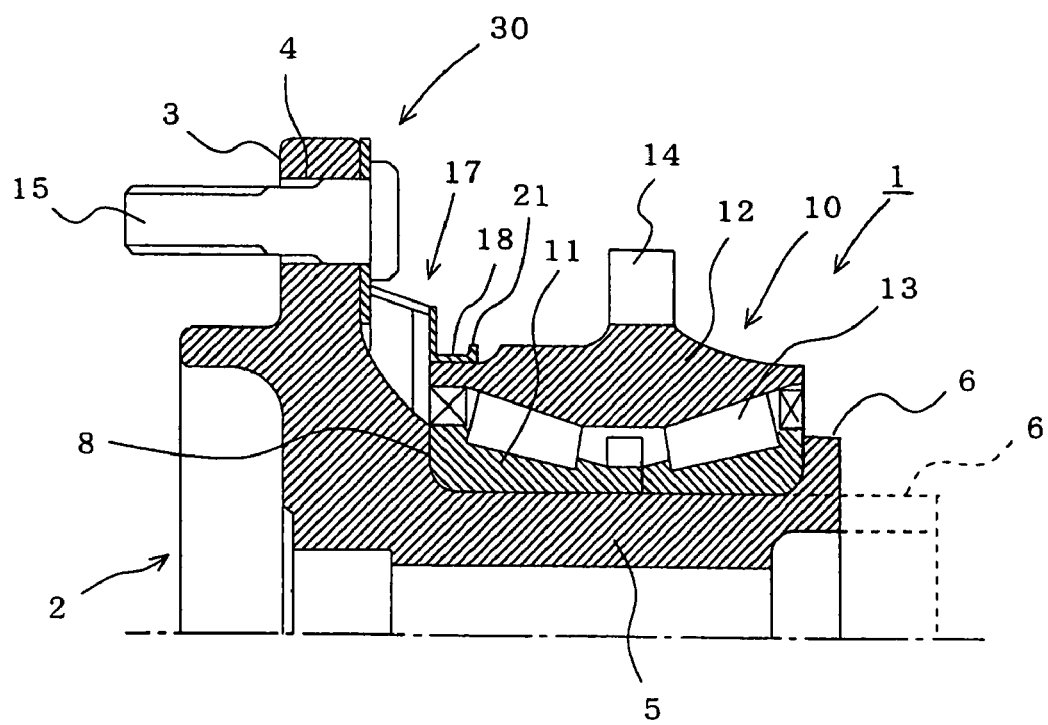
FIG. 9 is cross-sectional view of a portion of a sixth embodiment of an axle bearing apparatus of the invention.

FIG. 9 is a cross-sectional view of a half portion of an axle bearing apparatus according to a sixth embodiment of the invention on one side of a centerline (longitudinal axis) thereof. Those portions identical to those of the first embodiment will be designated by identical reference numerals, respectively, and explanation thereof will be omitted.

Conventionally, when the metal core 18 of the externally-mounting dust seal 17 was press-fitted onto the bearing portion 10, the metal core 18 was, in some cases, deformed, and the area of contact of the metal core 18 with the bearing portion 10 was reduced, so that the metal core 18 was liable to be withdrawn from the bearing portion 10. And besides, the roundness of the lip 20 was, in some cases, lowered by the deformation of the metal core 18, and the lip 20 was not properly held in sliding contact with the surface of the flange 2 or the surface of the slinger 30, so that the muddy water-proof ability was lowered.

In this embodiment, an inner end portion of a metal core 18 of a dust seal 17 is bent radially outwardly to form a bent portion 21, thereby increasing the rigidity of the metal core 18 so as to prevent the metal core 18 from being deformed when it is press-fitted onto a bearing portion 10.

With this construction, the metal core 18 is positively press-fitted on the bearing portion 10, and will not be withdrawn therefrom, and besides the lip 20 is positively held in sliding contact with the surface of the flange 3 or the surface of the slinger 30 over the entire periphery thereof, thereby preventing the intrusion of muddy water.

Although the specific embodiments of the present invention have been described above, the invention is not limited to the illustrated axle bearing apparatuses, and can be applied also to any other suitable axle bearing apparatus within the scope of the technical ideas of the invention. Furthermore, the rolling elements 30 can be replaced by balls.

What is claimed is:

1. An axle bearing apparatus comprising:
   a hub shaft that includes a wheel-mounting flange formed at an outer side thereof and a cylindrical portion formed on an inner side thereof, a plurality of bolt holes being formed through the flange;
   a bearing portion that is press-fitted on the cylindrical portion of the hub shaft and includes an inner ring, an outer ring and rolling elements disposed between the inner and outer rings;

a slinger that includes a through hole formed through a central portion thereof and has an outer diameter generally equal to an outer diameter of the flange, wherein the through hole is fitted on the cylindrical portion, and the slinger is press-clamped to an inner side surface of the flange by bolts press-fitted respectively in the plurality of bolt holes;

a plurality of O-rings interposed between the flange and the slinger; and ring-shaped grooves configured to receive the plurality of O-rings formed in an inner side surface of the flange in concentric relation to each other, the ring-shaped grooves being disposed respectively at inner and outer peripheral sides of the bolt holes.

2. The axle bearing apparatus according to claim 1, wherein the slinger includes a rib that is formed at an outer periphery thereof and is fitted to an outer periphery of the flange.

3. The axle bearing apparatus according to claim 2, wherein one of the plurality of O-rings is disposed between the flange and the rib.

4. The axle bearing apparatus according to claim 2, wherein the rib comprises a bent portion disposed perpendicular to a remainder of the slinger.

5. The axle bearing apparatus according to claim 2, wherein a width of the rib is generally equal to the width of the flange.

6. The axle bearing apparatus according to claim 1, wherein the plurality of O-rings includes a first O-ring disposed above one of the plurality of bolt holes and a second O-ring disposed above the one of the plurality of bolt hales.

7. The axle bearing apparatus according to claim 6, wherein the flange includes the inner side surface of the flange and an end surface disposed perpendicular to the inner side surface of the flange, wherein the first O-ring and the second O-ring are disposed on the inner side surface of the flange, and wherein the plurality of O-rings includes a third O-ring disposed on the end surface.

8. The axle bearing apparatus according to claim 1, wherein the slinger directly contacts the flange.

* * * * *